US007192548B2

(12) United States Patent
Dambricourt (10) Patent No.: US 7,192,548 B2
(45) Date of Patent: Mar. 20, 2007

(54) MOLD FOR INJECTION MOLDING OF A FLEXIBLE TUBE AND INJECTION MOLDING METHOD

(75) Inventor: Géry Dambricourt, Escoutoux (FR)

(73) Assignee: CEP Industrie, Saint Remy sur Durolle (FR)

( * ) Notice: Subject to any disclaimer, the term of this patent is extended or adjusted under 35 U.S.C. 154(b) by 26 days.

(21) Appl. No.: 10/221,729

(22) PCT Filed: Mar. 16, 2001

(86) PCT No.: PCT/FR01/00799

§ 371 (c)(1),
(2), (4) Date: Nov. 15, 2002

(87) PCT Pub. No.: WO01/68347

PCT Pub. Date: Sep. 20, 2001

(65) Prior Publication Data

US 2003/0173711 A1 Sep. 18, 2003

(30) Foreign Application Priority Data

Mar. 17, 2000 (FR) .................................. 00 03468

(51) Int. Cl.
*B29C 45/04* (2006.01)
*B29C 45/36* (2006.01)
*B29C 45/40* (2006.01)
*B29C 45/43* (2006.01)
*B29C 45/67* (2006.01)

(52) U.S. Cl. ................... 264/335; 264/328.1; 425/574; 425/575; 425/577; 425/DIG. 10

(58) Field of Classification Search ............. 264/328.1, 264/328.11, 328.16, 335; 425/577, 574, 425/575
See application file for complete search history.

(56) References Cited

U.S. PATENT DOCUMENTS

| 3,314,105 | A |   | 4/1967 | Amsden |
| 3,570,107 | A | * | 3/1971 | von Matt ..................... 29/436 |
| 3,737,272 | A | * | 6/1973 | Segmuller ................... 425/595 |
| 4,618,121 | A | * | 10/1986 | Conti .......................... 249/59 |
| 4,733,801 | A | * | 3/1988 | Scammell .................. 222/107 |
| 4,764,103 | A | * | 8/1988 | Mitake ....................... 425/577 |
| 4,959,005 | A | * | 9/1990 | Sorensen .................... 425/577 |
| RE33,608 | E | * | 6/1991 | Sorensen .................... 206/519 |
| 5,068,065 | A | * | 11/1991 | Maus et al. ................ 264/1.33 |
| 5,840,231 | A | * | 11/1998 | Teng .......................... 264/154 |

(Continued)

FOREIGN PATENT DOCUMENTS

DE 1166457 3/1964

(Continued)

*Primary Examiner*—Christina Johnson
*Assistant Examiner*—Monica A Huson
(74) *Attorney, Agent, or Firm*—Leydig, Voit & Mayer, Ltd.

(57) ABSTRACT

The invention concerns in particular a mold for injection molding of a flexible tube, said mold comprising as molding tools, a nozzle receptacle, an impression and a core, housed in a stack of plates. The invention is characterized in that said molding tools have pairs of respective conical support surfaces, through which the tools are centered and aligned with one another, each support surface being formed by a portion of tools deprived of transverse mobility.

28 Claims, 6 Drawing Sheets

U.S. PATENT DOCUMENTS 5,925,303 A * 7/1999 Scheliga ............... 264/318
6,245,278 B1 * 6/2001 Lausenhammer
                     et al. .................. 264/328.1

FOREIGN PATENT DOCUMENTS

| DE | 1925674 | 11/1969 |
| DE | 43 18 014 | 6/1994 |
| FR | 1066799 | 6/1954 |
| FR | 1531148 | 10/1968 |
| FR | 2791635 | 10/2000 |
| WO | WO 86/04856 | 8/1986 |

* cited by examiner

MOLD FOR INJECTION MOLDING OF A FLEXIBLE TUBE AND INJECTION MOLDING METHOD

The present invention concerns, in general, the techniques for injection molding of hollow bodies such as those made of thermoplastic materials.

More specifically, the invention concerns, according to one of its features, a mold for the injection molding of a tube presenting a distribution spout supporting a neck which tapers radially to a tubular skirt and made of a thermoplastic injection material which is flexible at room temperature, said mold comprising plates which are applied one on the other to form a stack that follows an injection direction that is transverse with respect to the plates, from a first side where a hot block is located, which contains the molten injection material, to a second side which is at a distance from the first side, and a set of molding tools comprising at least one nozzle receptacle, an impression, and a core housed in the stack of plates, the nozzle receptacle being adjacent to the hot block and accommodating a nozzle, which has an inlet that communicates with the hot block and an outlet that communicates, with a molding cavity through an injection passage, the core comprising at least a first base that is elongated, following a direction that is the reverse of the injection direction, by a molding pin housed in the impression and ending in a free end, the molding cavity being delimited by at least the nozzle receptacle, the impression, and the molding pin of the core and extending in the injection direction from the injection passage, the core being held in the stack of plates by at least its base and by the free end of the molding pin, and the stack of plates comprising two blocks, which are selectively applied against each other at an interface between two adjacent plates forming a mold joint that allows, as desired, the opening or closing of the mold.

Molds of this type are used today to injection-mold cartridges rigid at room temperature, closed by a piston, and intended to contain viscous materials such as glues or mastics.

These molds are not suited for the preparation of tubes that are flexible at room temperature and that are resistant to cracking under stress, such as tubes used for the packaging of cosmetic products.

Indeed, the manufacture of these tubes implies the use of highly viscous materials to impart the required flexibility in order to ensure the resistance of the thin walls to cracking under stress.

These highly viscous materials, which are shaped to form a thin wall must be injected at high pressure. Thus, the mold must be designed to resist deformations that may occur during injection due to the effect of the thrust of the material in the mold.

Moreover, these tubes must have a resistance to cracking under stress that is equal at all points of their walls. Therefore, it is necessary for the wall thickness to be perfectly uniform and for the different sheets of injected molten material that form the tube to rejoin as quickly as possible and to become welded to each other in an optimal manner.

More generally, the invention concerns the architecture and the molding functions of injection, cooling, and ejection for injection forming a flexible tube, given the specific stresses inherent in the material used and its flexibility, dimensions, and the shape of the flexible tube.

The purpose of the invention is to propose a mold which is capable, even in its most elementary embodiment, to solve at least one of these problems.

For this purpose, the mold of the invention, which also is in conformity with the generic definition given in the preamble, is essentially characterized in that the set of molding tools comprising at least the nozzle receptacle, the impression, and the core, present respective pairs of at least partially conical support surfaces which are aligned in the direction of injection, in that these molding tools are mutually centered and aligned with one another, by pairs of tools being constituted next to each other, by means of an axial force that moves the respective support surfaces of the tools of each constituted pair together, and in that each support surface of each tool of each constituted pair is formed by a part of this tool that is deprived of functional mobility in the direction traverse to the injection direction.

The support surface can thus form, as a result of two-by-two contact, at least three interfaces through which the molding tools are applied, two-by-two, and with centered support one against the other, where the support surfaces presented by the molding tools for each of these three interfaces preferably consist of respective single-block parts of these molding tools.

The nozzle receptacle and the impression can each even be integrally formed from a single piece.

In the preferred embodiment variant of the invention, the mold joint passes between the nozzle receptacle and the impression.

To further improve removal from the mold, the molding pin advantageously presents a surface state which, in order to produce minimal adhesion of the tube to this molding pin after injection, is at least equivalent to the surface state obtained by the application of at least one of the surface treatments consisting of sandblasting, micro-finishing, a laser treatment, and a chemical treatment.

To improve the homogeneity of the injected tube, the pair of support surfaces which the core and the nozzle receptacle present preferably consists of a concave support surface of the core and a convex support surface of the nozzle receptacle, which results in the distribution spout of the tube terminating in a cup.

In the mold of the invention, the nozzle receptacle can be formed to mold at least one external surface of the neck of the tube up to a zone of connection with the skirt.

The molding pin of the core itself may extend from the first base and mold an internal surface of the skirt; it may present a shoulder which borders its free end and which is capable of molding an internal surface of the neck.

Moreover, the core preferably comprises an external part and an internal part, which are shaped so that the internal part extends, along a direction which is the reverse of the injection direction, from a second base of the core to a tip which is arranged at the free end of the molding pin, and so that the internal part is mounted axially so that it can slide in the interior of the external part between a support position, for which the tip is supported on the nozzle receptacle, and an open position, for which the tip is distant from the nozzle receptacle.

Under these conditions, the tip of the internal part of the core can mold an internal surface of the spout, and the slides can be mounted so they can be moved in translational movement in radial recesses of the nozzle receptacle to mold an external surface of the spout, where these slides can close, in a sealing manner, in the open position and in the closed position, the recesses of the nozzle receptacle in which they are mounted so they can move.

In particular, the slides can be two in number, they can be arranged so they are aligned with one another on both sides of the injection passage, and they can be mounted so they can move, transversely with respect to the injection direction, between a closed position where they are in contact and an open position where they are mutually separated form each other, the nozzle receptacle being penetrated by an air conduit which opens between the slides and is connected to a pressurized air source, and the slides close and open the air conduit in their closed position and in their open position, respectively.

In the case where the core is made up of two parts, the mold can comprise on the second side, a hydraulic cylinder which selectively displaces the second base of the core, where this hydraulic cylinder, to obtain the centering support of the core on the nozzle receptacle, can displace the second base of the core, along a direction which is opposite the injection direction, to a stop which defines a length of the internal part of the core for which this internal part of the core undergoes elastic compression due to the support of its point on the nozzle receptacle.

The hydraulic cylinder is preferably a double-acting hydraulic cylinder capable of selectively releasing the second base of the core along the direction of injection after the injection of the skirt of the tube, thus making it possible to separate the tip and the nozzle receptacle from each other.

To obtain an adequate cooling of the mold, the internal part of the core is advantageously traversed by an axial channel in which is housed a hollow needle which extends from a connection end which is arranged in the second base of the core to a distribution end, arranged in proximity of the tip of this internal part, where the connection end of this needle, dependent on the mold, is connected to a source of cooling fluid, and the needle and the axial channel are separated from each other by an interstice which presents to the fluid injected in the needle a circulation path which returns to the second base of the core.

In addition, it can be useful to use an arrangement such that the internal part and the external part of the core both present first axial sections and second axial sections, where the second ones are relatively closer to the tip than the first ones, and the first axial sections achieve, between the internal part and the external part of the core, a thermal coupling which determines a first thermal flow, such that the second axial section achieves, between the internal part and the external part of the core, a thermal coupling determining a second thermal flow and such that the second flow is greater than the first flow.

If the molding tools are arranged, one with respect to another, with a maximum clearance, and if they are arranged, with respect to the plates, with a second maximum clearance, one should proceed in such a manner that the second maximum clearance is greater than the first maximum clearance, and so that the plates are regulated as far as their temperature is concerned to present a differential dilatation between themselves, which is less than the second maximum clearance.

The injection passage preferably comprises a central feed channel and radial feed channels, each one of which extends from the central channel to a zone of connection to the spout, where this radical channel presents a connection width and where the spout presents a predetermined perimeter, and the added widths of the radial feed channels advantageously present at least 15% of the predetermined perimeter of the spout, or, even more advantageously, more than 25% of the predetermined perimeter of the spout.

In this case, the radial channels can, in addition, present a width which increases, along a centrifugal radial direction, until it reaches a maximum width in the zone of connection to the spout.

To improve the spread, in the form of a sheet, of the injected material, the molding cavity preferably presents an annular narrowed zone beyond the zone of connection of each radial channel to the spout.

To guarantee a fixed radial position for each slide in the closed position of the mold, this slide is preferably connected, at a distance from the injection passage, to an inclined surface of the first block of plates, which works in cooperation with an inclined surface of the second block of plates.

To prevent any residual adhesion of the injection material to the nozzle, the latter can comprise, between its inlet and its outlet, a stop plug which makes it possible to interrupt a flow of injection material from the hot block toward the injection passage, at the outlet of the nozzle.

The mold of the invention can be shaped so that the internal surface and the external surface of the skirt form, between them, in a mid-plane of the tube, an angle of less than 0.002 radians, the skirt thus presenting over its entire surface a very homogenous resistance to deformation.

The invention also concerns a method for the manufacture of a tube presenting a distribution spout on top of a neck which tapers radially to a flexible tubular skirt, where this method essentially comprises a molding phase and a mold removal phase, the molding phase consisting in forming the tube by injecting, through an injection passage, a molten thermoplastic injection material into a molding cavity presenting a mold joint and at least partially delimited by a core and an impression, the spout being molded in a part of the molding cavity which is adjacent to the injection passage; and the mold removal phase, which follows the molding phase after solidification of the injected material, and comprising a holding operation which consists in temporarily holding the tube, a mold release operation which consists in partially extracting the core from the tube, an opening operation which consists in opening the molding cavity, and an ejection operation which consists in ejecting the tube from the molding cavity, where the opening operation follows to the mold release operation, and consists in opening the molding cavity at the mold joint, between the neck and the skirt of the nozzle.

According to the invention, this method is essentially characterized in that it comprises an accompanying operation, concomitant with at least one of the operations of mold release and of release, and consisting in blowing in air between the core and the tube.

Moreover, the holding operation is preferably carried out by holding the tube by the spout by means of slides which have been placed beforehand in a mutually close position before the molding operation, where this holding operation is continued during the opening operation.

The ejection operation can essentially consist of interrupting the holding operation by separating the slides from each other and by blowing air between the separated slides and an external surface of the spout.

Finally, the holding operation is preferably interrupted before the end of the opening operation, so that the tube formed falls by its own weight between the two parts of the open mold.

Other characteristics and advantages of the invention will become clear from the description below, which is given for the sake of information and without limiting the scope of the invention, with reference to the drawings in the appendix, wherein.

For convenience and in conformity with the figures, the mold is viewed with an orientation in which the spout of the tube is located above the skirt of the tube, where it is understood that in practice the use of the mold tends to be such that the injection direction of the tube is horizontal.

Figure 3:
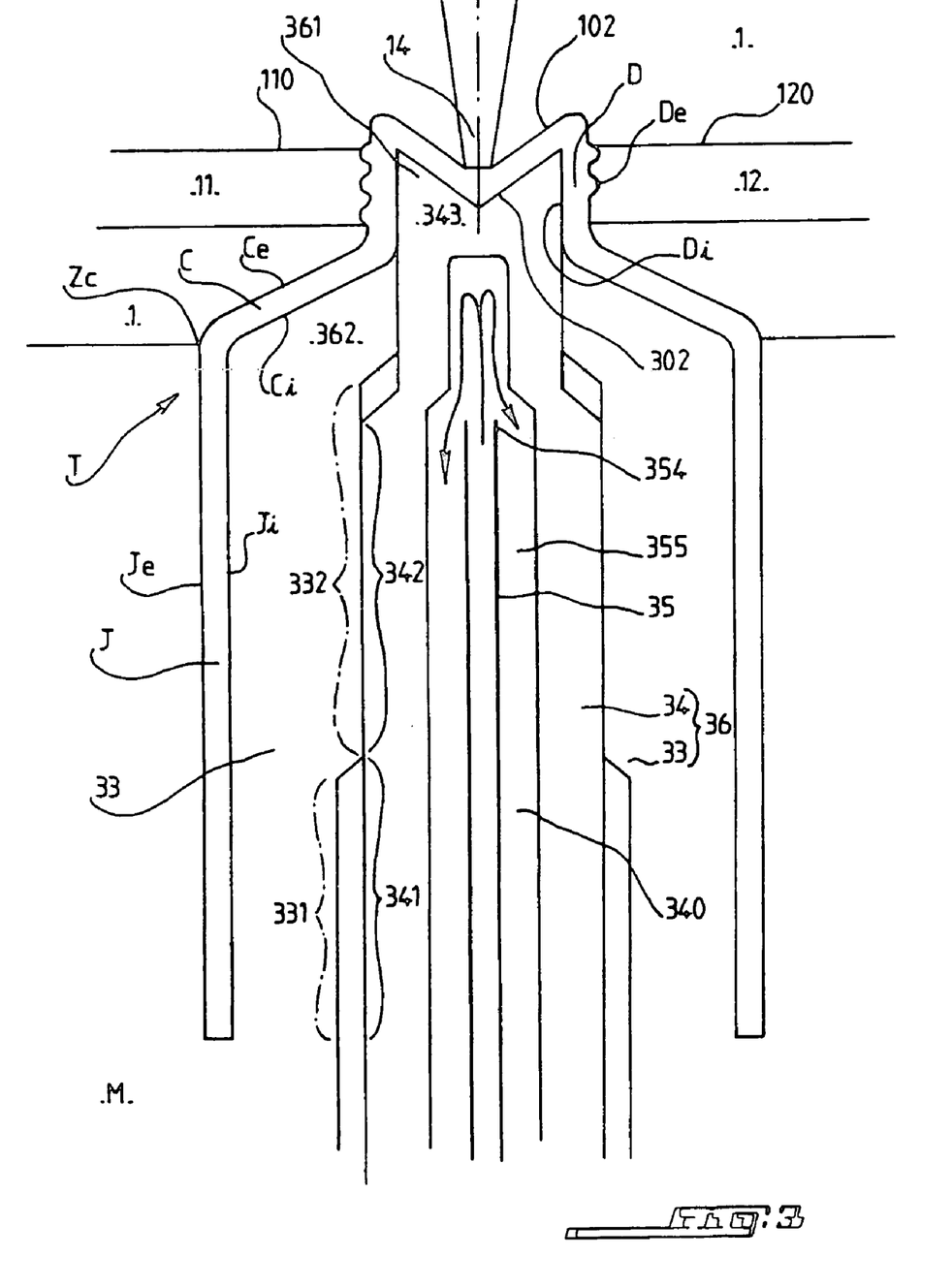
FIG. 3 is a cross-sectional view of an enlarged detail of the mold of FIG. 2 and of the tube represented at the end of the injection process.
Figure 4:
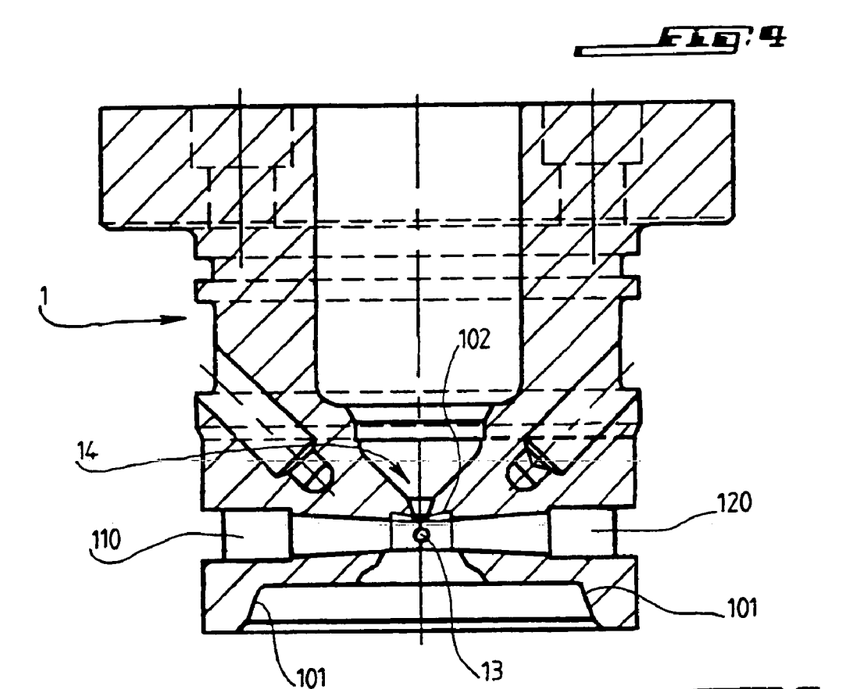
FIG. 4 is an enlarged cross-sectional view of the nozzle receptacle shown in FIG. 1.
Figure 5:
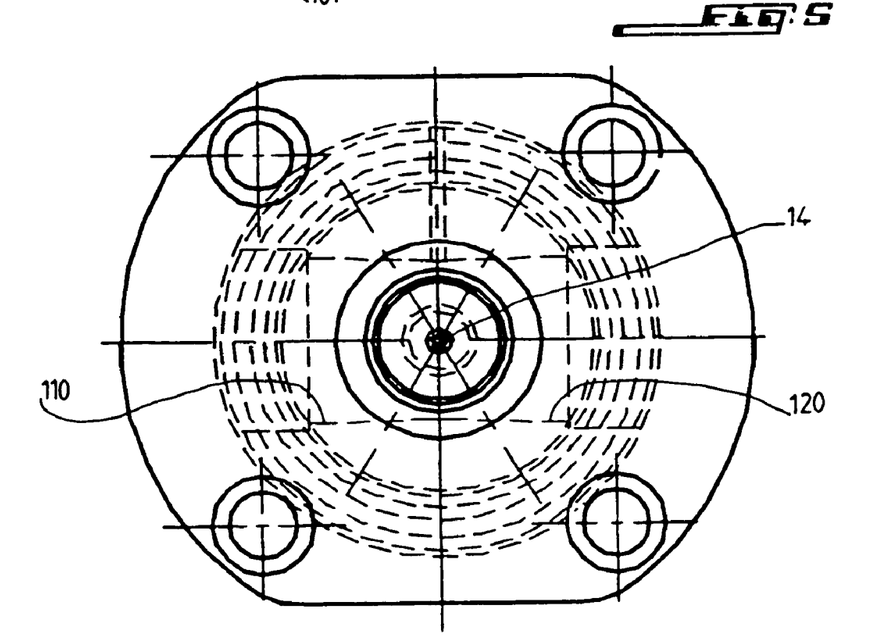
FIG. 5 is a top view of the nozzle receptacle shown in FIG. 4.
Figure 6:
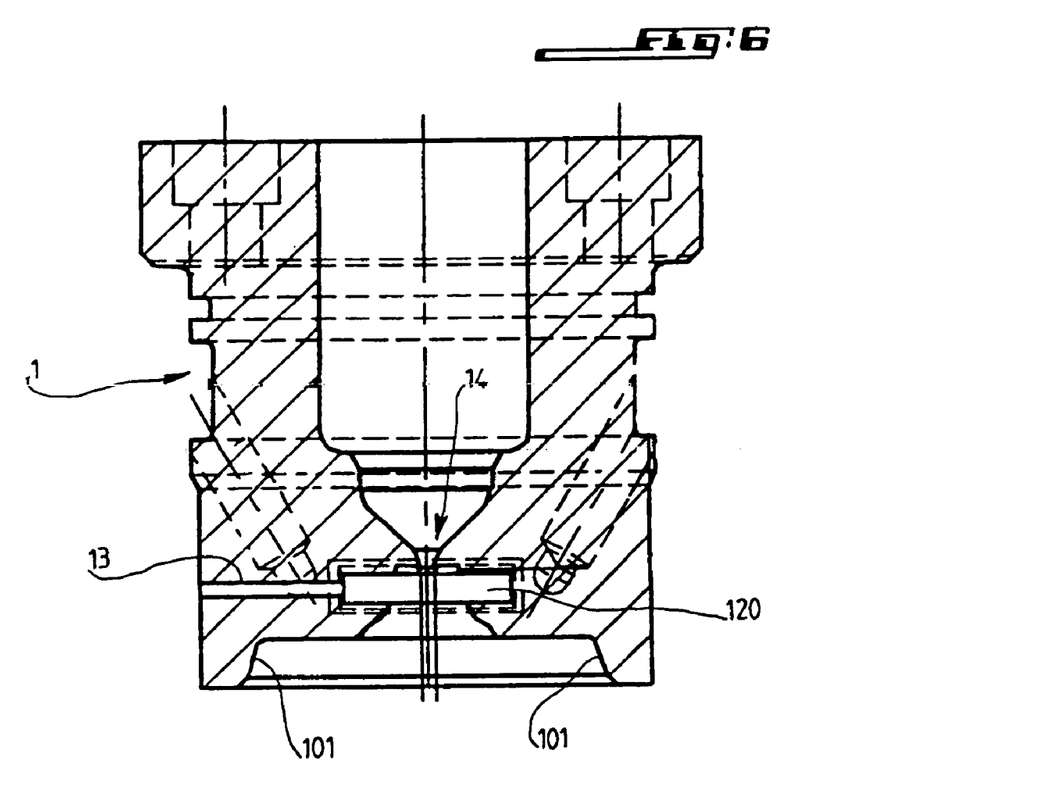
FIG. 6 is an enlarged cross section of the nozzle receptacle as represented in FIG. 2.
Figure 7:
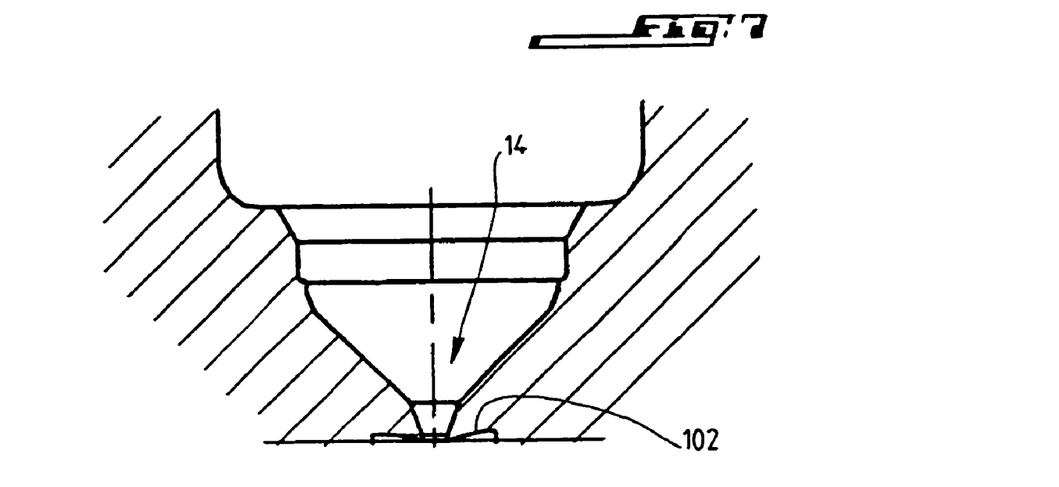
FIG. 7 is a partial enlarged cross-sectional view of the nozzle receptacle as shown in FIG. 6.

The invention concerns a mold which allows the injection of a tube T which is partially shown in FIG. 3 and which is made of a thermoplastic injection material which is flexible at room temperature.

This tube presents a distribution spout D which is above the top of neck C, the latter tapering radially to a tubular skirt J.

Figure 1:
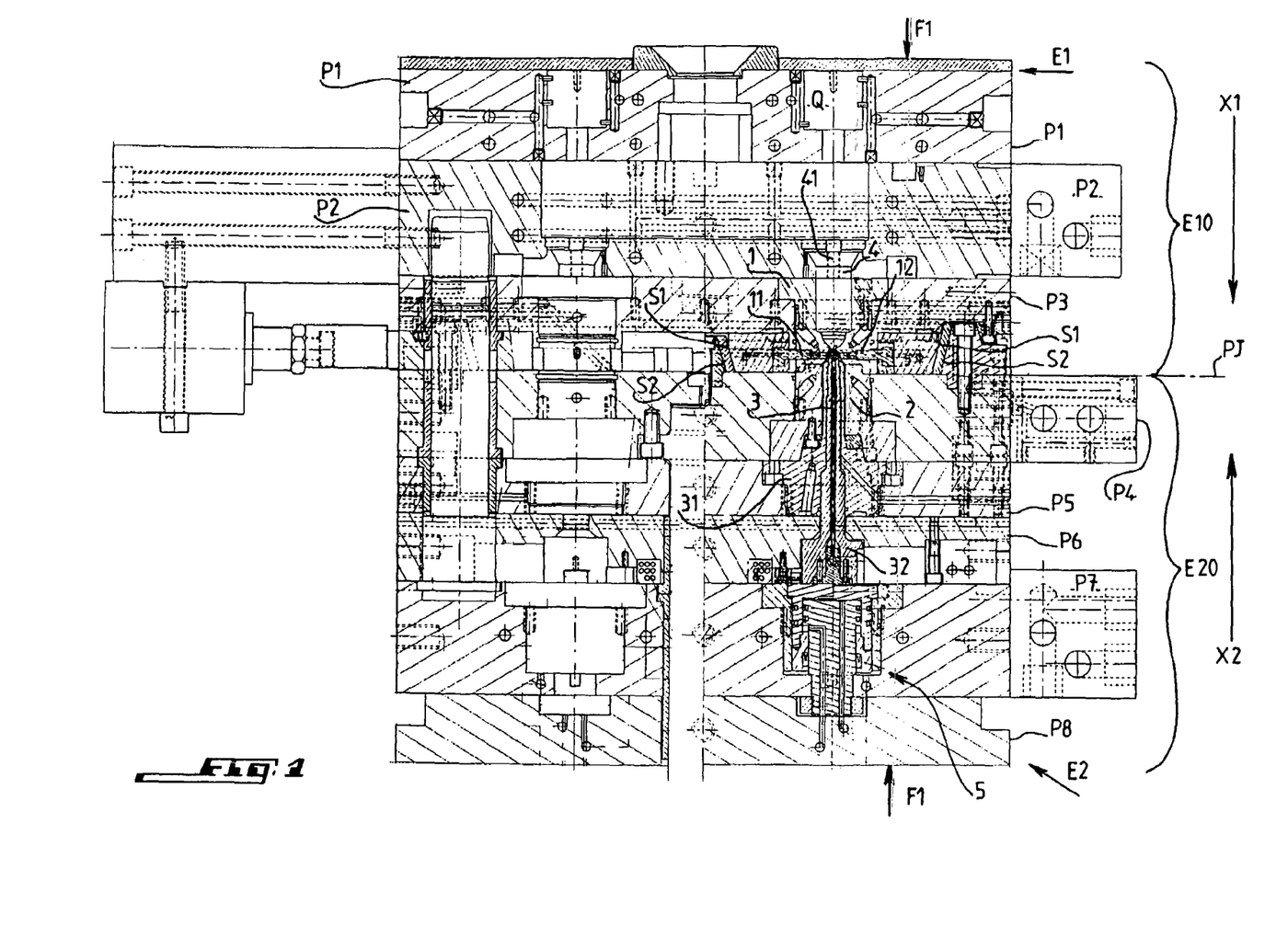
FIG. 1 is a cross-sectional view of a mold according to the invention, where the section is taken along a first plane that includes the direction of injection.

As shown in FIG. 1, the mold first comprises a set of plates P1–P8 which are applied one to another, and which form a stack consisting of two blocks E10 and E20.

This stack extends, along a direction of injection, noted X1 and transverse with respect to the plates P1–P8, from the first side E1 to a second side E2, which is at a distance from the first side E1.

The blocks E10 and E20 are intentionally applied against each other at the interface, which is also the interface between the two adjacent plates P3 and P4, and which forms a mold joint PJ that allows the opening and the closing of the mold. On the first side E1 of the mold, a hot block Q is provided, which is a reservoir intended to contain the molten injection material.

Moreover, the mold comprises a set of molding tools, comprising a nozzle receptacle 1, an impression 2 and a core 3, and which are housed in the stack of plates.

Figure 10:
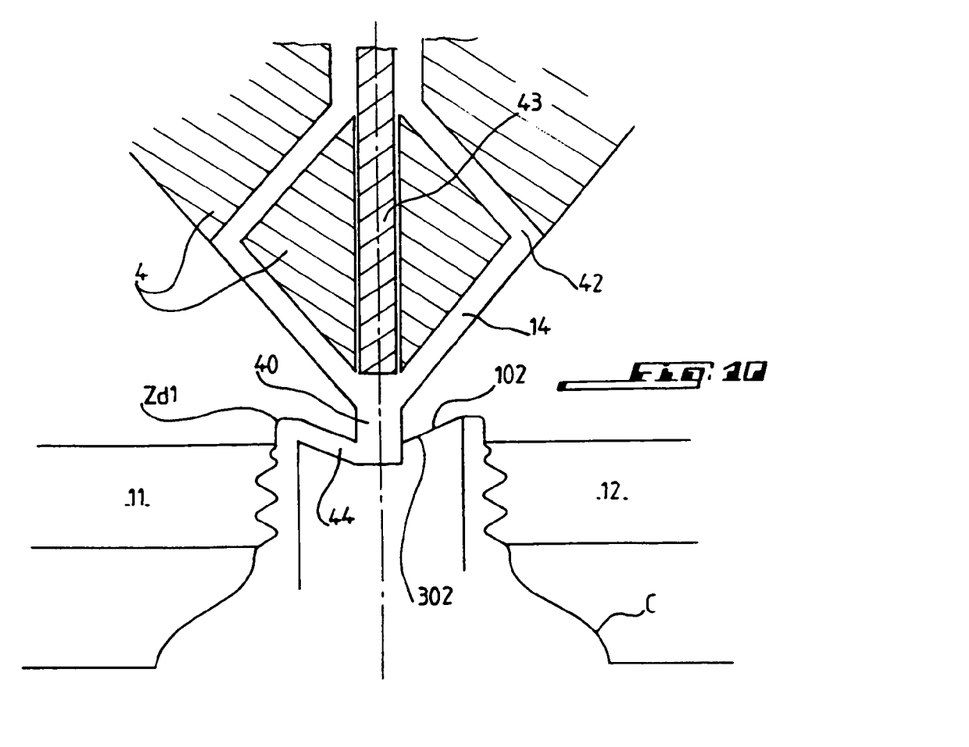
FIG. 10 is a schematic cross-sectional view of the part of the mold in the vicinity of the spout of the tube.

The nozzle receptacle 1, which is shown in detail in FIGS. 4–7, is adjacent to the hot block Q and it is intended to receive a nozzle 4, which is only visible in FIGS. 1 and 10.

An inlet 41 of the nozzle 4 communicates with the hot block Q, and an outlet 42 of said nozzle (FIG. 10) communicates, via an injection passage 14, with a molding cavity K (FIG. 2) into which the material intended to constitute the tube is injected.

The core 3 comprises a first base 31 which is extended, along a direction X2 which is the reverse of the injection direction X1, by a molding pin 36 housed in the impression 2 and ending by a free end 361 (FIG. 3).

Under these conditions, the molding cavity K is delimited by the nozzle receptacle 1, by the impression 2, and by the molding pin 36 of the core 3; and it extends, along the injection direction X1, from the injection passage 14.

Figure 2:
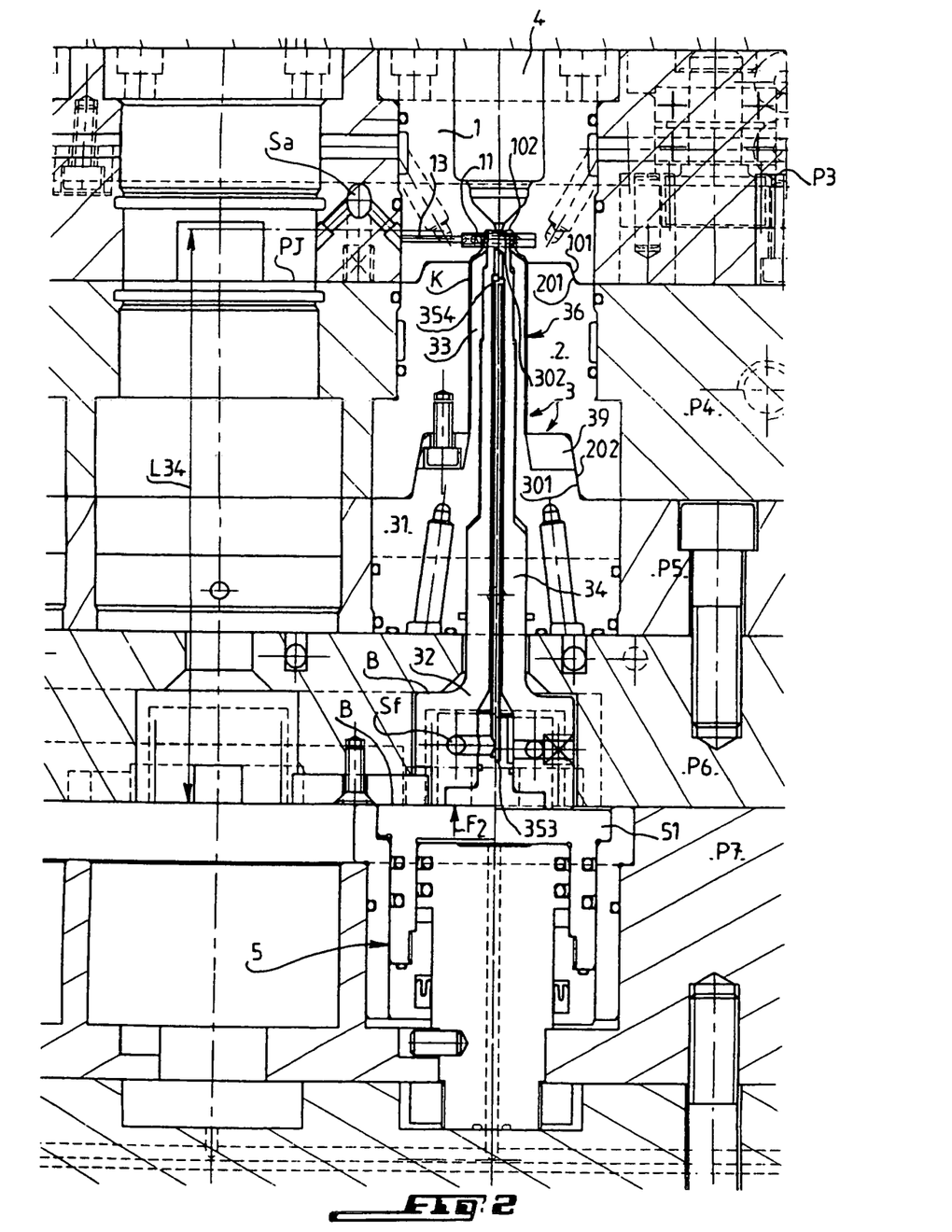
FIG. 2 is a cross-sectional view of a detail of the mold of FIG. 1, represented in larger scale, the section being taken along a second plane that includes the direction of injection and is perpendicular to the plane of FIG. 1.

As shown first in FIG. 2, the core 3 is maintained in the stack of plates by its base 31, and by the free end 361 of the molding pin 36.

According to a specific feature of the invention, the molding tubes formed by the nozzle receptacle 1, the impression 2, and the core 3, present pairs of respective support surfaces, referenced 101 and 102, for receiving the nozzle, 201 and 202 for the impression, 301 and 302 for the core 3, these pairs of support surfaces being at least partially conical and oriented along the injection direction X1.

According to a second specific feature of the invention, these molding tools, 1, 2 and 3 are mutually centered and aligned with respect to one another, by the pairs of tools which are constituted next to each other and which are represented by the pairs 1-2, 2-3 and 3-1, by means of an axial force F1+F2 (FIGS. 1 and 2) which moves the respective support surfaces of the tools of each constituted pair 1-2, 2-3 and 3-1 toward each other, that is, the support surfaces 101 and 201 for the nozzle receptacle and the impression, the support surfaces 202 and 301 for the impression and the core, and the support surfaces 302 and 102 for the core and nozzle receptacle.

Finally, according to a third specific feature of the invention, each support surface of each tool of each of the constituted pairs 1-2, 2-3 and 3-1, that is, each of the support surfaces 101, 201, 202, 301, 302 and 102 is formed by a part of the corresponding tool which his deprived of functional mobility in the direction traverse with respect to the injection direction X1, where this part is thus fixed or movable along only one direction that is essentially parallel to the injection direction X1.

In the illustrated embodiment variant, the axial force F1+F2 consists of a force of F1 (FIG. 1), which moves the plates against each other, and a force F2 (FIG. 2), which moves the core 3 against the nozzle receptacle 1; this will be described in greater detail below.

Thus, the support surfaces 101, 102, 201, 202, 301 and 302 form, via two-by-two contact, three interfaces, designated 101–201, 202–301, and 302–102, and by which the molding tools 1, 2 and 3 are applied two-by-two with centering support against each other.

Moreover, to ensure a precise positioning of the molding tools one with respect to another, the support surfaces 101, 102, 201, 202, 301 and 302 presented by these molding tools to each one of these three interfaces 101–201, 202–301, 302–102 are formed by respective single-block parts of these molding tools 1, 2, 3.

In other words, the molding tools are each formed from a single piece, at least at the location of their support surface, where the nozzle receptacle 1 and the impression 2 can themselves each be integrally formed from a single piece.

In the preferred and illustrated embodiment variant of the invention, the mold joint PJ passes between the nozzle receptacle 1 and the impression 2; that is, the plates P3 and P4 can be easily separated from each other.

To facilitate the removal of tube T from the mold, the molding pin 36 is preferably subjected to at least one surface treatment chosen from the group of surface treatments consisting of sandblasting, micro-finishing, a laser treatment, and a chemical treatment, and whose role is to reduce the surface roughness of the molding pin.

For example, the latter can be subjected to sandblasting, followed by a micro-finishing, optionally followed by a laser treatment which effects superficial melting of the surface.

In the case where sandblasting is carried out, it can be very advantageously followed by a treatment capable of eliminating the resulting micro-points, for example by micro-finishing.

Similarly, in the case where micro-finishing is carried out, the treatment is very advantageously preceded by a treatment which causes microroughness in the treated surface, for example by sandblasting.

Other surface treatments can optionally be chosen provided that they do not lead, in comparison to the treatments cited above, to a higher adhesion of the tube T to the molding pin 36 after injection.

The pair of support surfaces 302 and 102 which the core 3 and the nozzle receptacle 1 present, moreover, preferably consists of a concave support surface 302 of the core 3 and a convex support surface 102 of the nozzle receptacle 1.

Due to this characteristic and the initial kinetic energy of the material which is injected through the passage 14, the central feed channel 40, and the radial channels 44–46, which will be better described below, the material is laterally deflected along an annular direction with respect to the contact zones Z of the radical channels and of the spout D, during the injection.

This spreading itself has the effect that the different sheets of molten injection material which move into the molding cavity K, starting from different radial channels 44–46, rejoin and become fused to each other, and thus the spreading of the injection material is as homogeneous as possible.

Correlatively, as shown in FIG. 3, the distribution spout D of the injected tube ends in a cup, which imparts to the finished tube, after perforation of the cup, a particular user comfort, associated with the matching of the finger to the cup and also with the fact that any excess product that exits the tube is temporarily contained in the cup and can be returned to the tube due to the suction effect produced by the latter as soon as the pressure which deformed it is released.

As shown in FIG. 3, the nozzle receptacle 1 is shaped to mold the external surface Ce of the neck C of the tube, to the zone of connection Zc of the neck C to the skirt J, while the molding pin 36 of the core 3, which extends from the first base 31 (FIG. 2), molds the internal surface Ji of the skirt J and presents a shoulder 362 which borders its free end and which makes it possible to mold the internal surface Ci of the neck C.

In the preferred embodiment variant of the invention, at the level of the molding pin 36, the core 3 in fact comprises an external part 33 and an internal part 34.

The internal part 34 of the core 3 extends, along the direction X2, which is the reverse of the injection direction X1, from a second base 32 of the core 3 to a tip 343, which is arranged at the free end 361 of the molding pin 36.

The internal part 34 of the core 3 is mounted so that it can axially slide in the interior of the external part 33 between a support position, illustrated in the left half of FIG. 2, and in which the tip 343 rests against the nozzle receptacle 1, and an open position, illustrated in FIG. 3 on the right half of FIG. 2, and in which the tip 343 is at a distance for the nozzle receptacle 1.

More specifically, the internal part 34 of the core, of which the tip 343 molds an internal surface Di of the spout D, is located in its support position for the entire time during which the skirt J and optionally the neck C are injected, and it does not adopt its open position except for the injection of the spout D, or at least of the cup which closes it (FIG. 3).

The external surface De of the spout D is molded by slides 11, 12 (FIG. 1, 3 and 10) which are mounted so that they can undergo translational movement, transverse to the injection direction X1, in the radial recesses 110, 120 of the nozzle receptacle 1, and which close the latter in a sealing manner.

The slides 11, 12, which are preferably two in number, are arranged so that they are aligned on both sides of the injection passage 14, and they can assume, as desired, a closed position in which they are in contact, and an open position in which they are separated from each other, where the slides close the radial recesses of the nozzle receptacle regardless of their position.

Moreover, the nozzle receptacle 1 is penetrated by an air conduit 13 which opens between these slides 11, 12 and which is connected to a pressurized air source Sa, where the slides can thus close the air conduit 13 in their closed position and open it in their open position.

The movement of the internal part 34 of the core 3, which allows the later to change from its support position to its open position and vice versa, is controlled by a double-acting hydraulic cylinder 5, which is arranged in the vicinity of the second side E2 of the mold and which can displace the second base 32 of the core 3.

To obtain the centering support of the core 3 on the nozzle receptacle 1, the hydraulic cylinder 5 displaces the second base 32 of the core, in the direction X2, to a stop B that defines a length L34 of the internal part 34 of the core 3 for which this internal part 34 undergoes, due to the application of its tip 343 against the nozzle receptacle 1, an elastic compression which determines the support force F2 mentioned above.

As shown in the left part of FIG. 2, it is possible to impart to this compression a predetermined and fixed value, to limit the course of the piston 51 of the hydraulic cylinder 5 by proceeding in such a manner that, for example, this piston abuts against a stop B on an edge of the plate P6 and/or the base 32 abuts a stop B on an internal flange of the plate P6.

After the injection of the skirt J and optionally of the neck C of the tube T, the hydraulic cylinder is controlled to release the second base 32 of the core along the direction of injection X1, thus making it possible to separate the tip 343 of the internal part 34 of the core from the nozzle receptacle 1, and thus allowing the injection of the cup which closes the spout D (FIG. 3).

The plates of the mold are perforated in a known manner by channels which notably allow removal of the heat contributed by the injected molten material, and the solidification of the tubes after their injection.

Nevertheless, the preferred application of the mold of the invention for the injection molding of flexible tubes, including tubes having a relatively small size, requires finding specific solutions.

For this purpose, it is first useful to proceed in a maimer such that the molding tools 1, 2, and 3, at least when the axial force F1+F2 is applied, are arranged, one with respect to each other and transversely with respect to the injection direction X1, with a first predetermined maximum clearance Jm1 (not shown) and to proceed in such a manner that they are arranged, with respect to the plates P1–P8, with another predetermined maximum clearance Jm2 (not shown) that is greater than the first maximum clearance Jm1.

Moreover, the plates P1–P8 are regulated, as far as their temperature is concerned, so that they present, between themselves, a differential dilatation which is less than the second maximum clearance Jm2.

Thanks to these measures, the molding tools 1, 2 and 3 assume, each with respect to the others, a relative position during the injection which is substantially independent of the dilatation of the stacks of plates P1–P8.

To obtain an optimal operation of the mold of the invention, it is also useful to provide specific means which allow the establishment, along the molding pin 36, of temperature gradient adequate to allow the flow of the injection material.

For this purpose, the internal part 34 of the core is traversed by an axial channel 340, in which is housed a hollow needle 35 allowing the circulation of cooling fluid, for example water.

The hollow needle 35 comprises a distribution end 354 arranged, in the axial channel 340, in proximity to the tip 343 of this internal part 34, and a connection end 353 arranged in the second base 32 of the core, and connected, when the mold is used, to a source Sf of cooling fluid, such as a pressurized water pipe.

Moreover, the needle 35 and the axial channel 340 are separated from each other by an interstice 355, which offers a circulation route to the fluid injected into the needle 35 allowing it to return toward the second base 32 of the core.

Moreover, the internal part 34 and the external part 33 of the core 3 both have axial cross sections which work in mutual cooperation to ensure a diffusion of heat that varies along the molding pin 36.

More precisely, the internal part 34 has a first axial section 341 and a second axial section 342 which succeeds the first in the direction of the tip 343 of this internal part.

Similarly, the external part 33 has first and second axial sections, 331 and 332, both being arranged approximately opposite the first and second axial sections, 341 and 342, of the internal part 34.

The first axial sections 331 and 341 are radially spaced by a relatively large interval, so that they ensure a thermal coupling which determines a relatively weak thermal flow for a predetermined temperature difference between the axial channel 340 and the external surface of the molding pin 36.

By contrast, the second axial sections 332 and 342 are not spaced radially from each other except by a very small clearance, so that they ensure a thermal coupling which determines a relatively large thermal flow for a predetermined temperature difference between the axial channel 340 and the external surface of the molding pin 36.

By means of this structure, the heat contributed by the molten material is primarily discharged in the vicinity of the tip 343 of the internal part of the core 3, and in a much more moderate manner at a distance from this tip 343, so that the temperature at a distance from this tip is maintained at a value sufficient to ensure a satisfactory flow of the molten material intended to form the skirt J of the tube.

Figure 8:
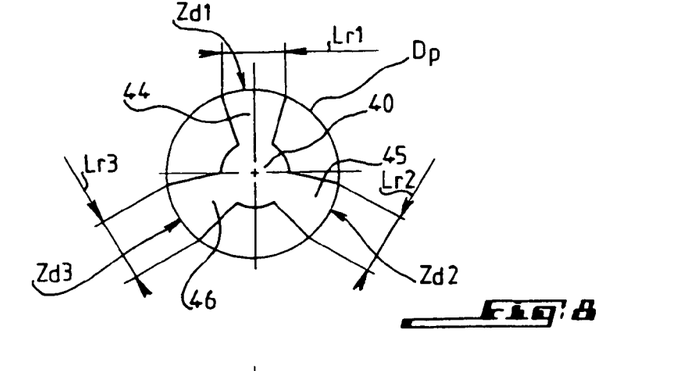
FIG. 8 is a top view of the interface of mutual support of the tip of the core and of the nozzle receptacle.

As shown in FIGS. 8 and 10, the injection passage 14 comprises a central feed channel 40 and radial feed channels, such as 44–46, each of which is hollowed out in the internal part of the core and extends from the central channel 40 to a corresponding zone, labeled Zd1, Zd2 and Zd3, of connection with the spout D.

It is appropriate to note that Dp denotes the perimeter of the spout D, that is the perimeter of the visible circle in FIG. 8, and that Lr1, Lr2 and Lr3 denote the respective widths of the radial channels 44, 45 and 46 at the place where they are connected to the spout D; it is advantageous to proceed in such a manner that the cumulative connection widths Lr1, Lr2, Lr3 of the radial feed channels 44–46 represent at least 15% of the perimeter Dp of the spout D, and even more advantageously 25% of this perimeter, so as to ensure a maximum spreading of the sheets of molten material which traverse these radial channels and to ensure as quickly as possible a constitution of an annular flow of the material at the outlet of the zones Zd1, Zd2, Zd3.

To preserve as large as possible a support surface on the nozzle receptacle for the end 361 of the core, it is particularly advantageous for the radial channels 44–46 to have a width which increases, along a centrifugal radial direction, until it reaches a maximum width Lr1, Lr2, Lr3 in the zone Zd1, Zd2, Zd3 of connection to the spout D.

Figure 9:
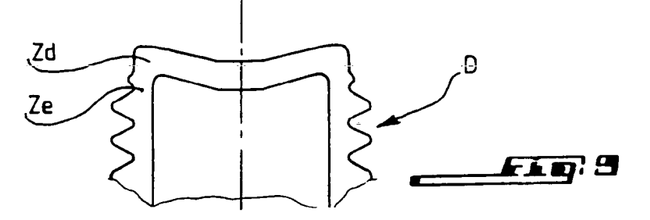
FIG. 9 is an enlarged partial cross-sectional view of the spout of the tube after injection.

Moreover, as shown in FIG. 9, the molding cavity K has an annular narrowed zone Ze beyond the zone Zd1, Zd2, Zd3 of connection of each radial channel 44–46 to the spout D; the presence of such a narrowed zone Ze also promotes spreading of the sheets of molten material.

As shown in FIG. 1, each one of the slides 11 and 12 is connected at a distance from the injection passage 14 to an inclined surface S1 of the first block E10 of the plates, and this first inclined surface S1 works in cooperation with a second inclined surface S2 of the second block E20 of plates to guarantee a fixed radial position of this slide 11, 12 in the closed position of the mold.

As is also shown in FIG. 10, the nozzle 4 has a stop plug 43 at its outlet 42 which is controlled, in its translational movement, to interrupt the flow of injection material at the site of the central injection channel 40 at the end of the injection.

The mold of the invention, in particular in the case where the joint plane PJ passes between the nozzle receptacle 1 and the impression 2, makes it possible to proceed in such a manner that the internal surface and the external surface Ji and Je of the skirt J of the tube form between themselves, in a mid-plane M of the tube, that is in the plane of FIG. 3, an angle of less than 0.002 radians.

The invention also concerns a method for the manufacture of tubes whose specificity resides notably in the manner of using the mold as described above.

This method substantially comprises a molding phase and a mold removal phase, the molding phase consisting in forming the tube by injecting into the molding cavity K, through the central injection channel 40, a molten thermoplastic injection material along an orientation such that the spout D is molded in a part of the molding cavity K that is adjacent to the central injection channel 40.

The phase of mold removal, which succeeds the molding phase, and which occurs after solidification of the injected material, substantially comprises a holding operation, a mold release operation, an opening operation, and an ejection operation.

The holding operation consists in temporarily holding the tube T in place, notably by means of slides 11 and 12, until this tube is ejected from the molding cavity K by the ejection operation.

The mold release operation consists in partially extracting the core 3 from the tube T, so that this tube can then slide easily with respect to the core.

According to the invention, the opening operation is consecutive to the mold release operation and it consists in opening the molding cavity at the mold joint PJ between the neck C and skirt J of the tube.

Moreover, the holding operation, which is carried out by holding the tube T by the spout D by means of slides 11 and 12 that have been placed beforehand in a mutually close position before the molding operation, is continued during the opening operation.

Moreover, the method of the invention preferably comprises an accompanying operation, which is concomitant with at least one of the operations of mold release and of opening, and which consists in blowing air between the core 3 and the tube T.

The ejection operation then essentially consists in interrupting the holding operation by separating the slides 11 and 12 from each other, and in blowing air between the separated slides and the external surface De of the spout D.

Finally, the holding operation is advantageously interrupted before the end of the opening operation.

Thus, the sequence of operations is preferably as follows.

First, the molten material is injected into the molding cavity K at a high pressure, preferably 1250–2500 bar, while the compression force F1 is applied to the stack formed by the plates P1–P8 to hold them in close contact with each other, the slides 11 and 12 are closed, and the hydraulic cylinder 5 pushes the support surface 302 of the internal part 34 of the core 3 against the support surface 102 of the nozzle receptacle 1.

Toward the end of the injection, the hydraulic cylinder 5 is controlled to release the internal part 34 of the core 3 to allow the injection material to form the cup which closes the spout D. Then, the stop plug 43 is actuated to stop the flow of the molten material towards the molding cavity K.

After solidification of the injected material the compression force F1 ceases to be applied, and the plates P4 and P5 are slightly separated from each other while air is blown between the core 3 and the tube T. The relative movement of the plates P4 and P5 then allows the mold release collar 39 to detach the base of the skirt J of the tube from the molding pin 36, this detachment propagating along the entire length of the skirt J due to the double effect of the movement of the plates P4 and P5 and of the pressure of the blown air.

The mold is then opened at the mold joint PJ, that is by relative separation of the plates P3 and P4.

Even before the movement of opening the mold at the mold joint is completely finished the slides 11 and 12 are separated from each other while the air is blown through the air conduit 13.

The tube T formed then falls by its own weight between the two parts formed by the mold which is open at the mold joint.

As will be understood by a person skilled in the art upon reading the preceding description, the fact of providing the mold joint PJ between the nozzle receptacle and the impression offers, by comparison to the solution which consists in providing it at the base of the skirt J of the tube, the advantage that the tube T can then be ejected from the mold after the latter has been opened over a length barely greater than the length of the tube, while a mold which has a mold joint at the base of the tube must be opened over a length approximately twice as long to first allow the core to become disengaged from the impression, and then to allow the tube to become disengaged from the core.

Moreover, although the preceding description illustrated only one molding cavity K in the set of plates P1–P8, a person skilled in the art will understand that several molding cavities, for example 8, 16, 32 or more, can be provided in the same set of plates.

Similarly, a person skilled in the art will understand that the word conical, as applied here to the centering surfaces 101, 102, 201, 202, 301 and 302, has a broad meaning which includes any surface shape which is functionally equivalent to a conical surface from the point of view of the centering which it allows.

Indeed, although a conical surface in the strictest geometric sense constitutes a centering surface which is both effective and easy to construct, a pyramidal surface, for example, is included in the class of the conical surfaces, in the meaning which is given here to the word conical.

The invention claimed is:

1. A method for the manufacture of a tube having a distribution spout surmounting a neck that radially tapers to a flexible tubular skirt, comprising
a molding phase and a mold removal phase,
the molding phase, including forming the tube by injecting a molten thermoplastic injection material through a central injection channel into a molding cavity having a mold joint at least partially delimited by a core and an impression, the spout being molded in a part of the molding cavity adjacent to an injection passage; and
the mold removal phase, following the molding phase after solidification of the injection material, comprising
a holding operation including temporarily holding the tube by the spout by means of slides placed beforehand in a mutually closed position before the molding operation, and wherein the holding operation continues during the opening operation;
a mold release operation including partially extracting the core from the tube;
an opening operation including opening the molding cavity, and
an ejection operation including ejecting the tube from the molding cavity and interrupting the holding operation by separating the slides from each other, and blowing air between the separated slides and an external surface of the spout,
the opening operation being consecutive to the mold release operation and including opening the molding cavity at the mold joint between the neck and the skirt of the tube, further comprising
an accompanying operation concomitant with at least one of the operations of mold release and of opening, and which includes blowing air between the core and the tube to detach the tube from the core.

2. The manufacturing method according to claim 1, wherein the holding operation is interrupted before the end of the opening operation.

3. A mold for injection molding a tube having a distribution spout surmounting a neck that tapers radially to a tubular skirt made of a thermoplastic injection material which is flexible at room temperature, the mold comprising
plates applied to each other to form a stack of plates comprising first and second blocks extending along an injection direction which is transverse with respect to the plates, from a first side where a hot block containing molten injection material is located, to a second side which is at a distance from the first side, and
a set of molding tools comprising at least one nozzle receptacle, an impression and a core housed in the stack of plates,
the nozzle receptacle being adjacent to the hot block and receiving a nozzle, which has an inlet which communicates with the hot block and an outlet which communicates, through an injection passage, with a molding cavity,
the core comprising at least a first base extended along a direction which is the reverse of the injection direction by a molding pin housed in the impression and ending in a free end, the molding cavity being delimited at least by the nozzle receptacle, the impression and the molding pin, and extending along the injection direction from the injection passage, the core being held in the stack of plates by at least the first base and by the free end of the molding pin and the stack of plates comprising first and second blocks, which are selectively applied against each other at an interface between two adjacent plates forming a mold joint which allows opening or closing the mold, wherein the molding tools comprising at least the nozzle receptacle, the impression, and the core present respective pairs of at least partially conical support surfaces which are oriented along the injection direction, the molding tools being mutually centered and aligned with one another, by pairs of molding tools constituted next to each other, by means of an axial force extending along the injection axis that moves the respective support surfaces of the molding tools of each constituted pair toward one another, and wherein each support surface of each molding tool of each constituted pair is formed by a part of the molding tool that is deprived of functional mobility transverse to the injection direction, and wherein the at least partially conical support surfaces form, by two-by-two contact, at least three conical interfaces through which the molding tools comprising at least the nozzle receptacle, impression and the core bear against each other, two-by-two, with centering support against each other.

4. The mold according to claim 3, wherein the support surfaces presented by the molding tools to each one of the three interfaces are constituted by respective single-block parts of the molding tools.

5. The mold according to claim 3, wherein the nozzle receptacle and the impression are each formed of a single piece.

6. The mold according to claim 3, wherein the mold joint passes between the nozzle receptacle and the impression.

7. The mold according to claim 3, wherein the molding pin has a surface treatment equivalent to a surface treatment obtained by the application of at least one of sandblasting, a micro-finishing treatment, laser treatment, and chemical treatment.

8. The mold according to claim 3, wherein the pair of support surfaces which the core and the nozzle receptacle present consists of a concave support surface of the core and a convex support surface of the nozzle receptacle providing the distribution spout of the tube terminating in a cup.

9. The mold according to claim 3, wherein the nozzle receptacle is shaped to mold at least an external surface of the neck of the tube to a zone of connection with skirt.

10. The mold according to claim 3, wherein the molding pin extends from the first base, molds an internal surface of the skirt and presents a shoulder bordering its free end and capable of molding an internal surface of the neck.

11. The mold according to claim 10, wherein the core comprises an external part and an internal part, the internal part extending, along a direction which is the reverse of the injection direction, from a second base of the core to a point disposed at the free end of the molding pin, and wherein the internal part is mounted to axially slide in the interior of the external part between a support position, in which the tip rests against the nozzle receptacle, and a release position, in which the tip is at a distance from the nozzle receptacle.

12. The mold according to claim 11, wherein the tip of the internal part molds an internal surface of the spout.

13. The mold according to claim 3, wherein slides are mounted to allow translational movement in radial housings of the nozzle receptacle to mold an external surface of the spout.

14. The mold according to claim 13, wherein the slides, in the open position and in the closed position, seal the radial housings of the nozzle receptacle in which they are mounted.

15. The mold according to claim 14, including two slides arranged aligned with one another on both sides of the injection passage, the slides being mounted to allow transverse movement with respect to the injection direction, between a closed position where they are in contact and an open position where they are mutually separated, the nozzle receptacle being penetrated by an air pipe that opens between the two slides and is connected to a pressurized air source, wherein the slides close and open the air pipe in their closed position and in their open position, respectively.

16. The mold according to claim 11, comprising a hydraulic cylinder from the second side which selectively displaces the second base along the direction which is the reverse of the injection direction, to a stop which defines a length of the internal part, the internal part undergoing an elastic compression that is predetermined by support of its tip against the nozzle receptacle.

17. The mold according to claim 16, wherein the hydraulic cylinder is a double-acting hydraulic cylinder capable of selectively releasing the second base along the injection direction after injection of the skirt of the tube, allowing separation of the tip from the nozzle receptacle.

18. The mold according to claim 12, wherein the internal part is traversed by an axial channel in which a hollow needle is housed, extending from a connection end arranged in the second base to a distribution end arranged in proximity of the tip of the internal part, the connection end of the hollow needle being connected, during operation of the mold, to a source of cooling fluid, wherein the hollow needle and the axial channel are separated from each other by an interstice which provides a fluid circulation path which returns toward the second base.

19. The mold according to claim 11, wherein the internal part and the external part both present first and second axial sections, the second axial sections being relatively closer to the tip than the first axial sections, the first axial sections providing, between the internal and external parts, a thermal coupling which determines a first thermal flow, the second axial sections providing, between the internal and external parts, a thermal coupling which determines a second thermal flow, wherein the second flow is greater than the first flow.

20. The mold according to claim 3, wherein the molding tools are arranged, one with respect to the other, to provide a first maximum clearance, and wherein the molding tools are arranged, with respect to the plates, with a second maximum clearance that is greater than the first maximum clearance, the plates being temperature regulated to present, between themselves, a differential dilatation which is less than the second maximum clearance.

21. The mold according to claim 3, wherein the injection passage comprises a central feed channel and radial feed channels, each of the radial feed channels extending from the central channel to a connection zone with the spout, each radial channel having a connection width or the spout having a predetermined perimeter wherein the cumulative connection widths of the radial feed channels represent at least 15% of the predetermined perimeter of the spout.

22. The mold according to claim 21, wherein the cumulative connection widths of the radial feed channels represent more than 25% of the predetermined perimeter of the spout.

23. The mold according to claim 21, wherein the radial channels have a width that increases along a centrifugal radial direction until it reaches a maximum width in the zone of connection with the spout.

24. The mold according to claim 11, wherein the molding cavity has an annular narrowed zone beyond a zone of connection of each radial channel with the spout.

25. The mold according to claim 13, wherein each slide, at a distance from the injection passage, is connected to an inclined surface of the first block in cooperation with an inclined surface of the second block to provide a fixed radial position for the slide in the closed position of the mold.

26. The mold according to claim 3, wherein the nozzle comprises a stop plug for interrupting the flow of injection material from the hot block toward the tube at the height of the central injection channel.

27. The mold according to claim 3, wherein the skirt includes an internal surface and an external surface and the internal and external surfaces form between themselves, in a mid-plane of the tube, an angle of less than 0.002 radians.

28. A mold for injection molding a tube, comprising:
  a stack of plates comprising first and second blocks extending along an injection direction transverse with respect to the plates, from a first side bearing a hot block containing molten injection material, to a second side which is at a distance from the first side, wherein the first and second blocks are selectively applied against each other at an interface between two adjacent plates forming a mold joint which allows opening or closing the mold; and
  a set of molding tools comprising at least a nozzle receptacle, an impression and a core housed in the stack of plates;
    the nozzle receptacle being adjacent to the hot block and receiving a nozzle, wherein the nozzle has an inlet which communicates with the hot block and an outlet which communicates, through an injection passage, with a molding cavity,
      wherein the molding cavity is delimited at least by the nozzle receptacle, the impression and a molding pin, and extends along the injection direction from the injection passage;
    the core comprising at least a first base extended along a direction reverse of the injection direction by the molding pin housed in the impression and ending in a free end, wherein the core is held in the stack of plates by at least the first base, the free end of the molding pin and the stack of plates;
  wherein each molding tool contacts each of the other molding tools to form at least three partially conical interfaces so that each molding tool is deprived of functional mobility transverse to the injection direction, wherein the molding tools bear against each other at the interfaces with centering support against each other by means of an axial force extending along the injection axis.

* * * * *